US010224026B2

(12) United States Patent
Bordewieck et al.

(10) Patent No.: US 10,224,026 B2
(45) Date of Patent: Mar. 5, 2019

(54) ELECTRONIC DEVICE, SYSTEM, METHOD AND COMPUTER PROGRAM

(71) Applicant: Sony Corporation, Tokyo (JP)

(72) Inventors: Aurel Bordewieck, Kirchheim unter Teck (DE); Fabien Cardinaux, Stuttgart (DE); Wilhelm Hagg, Stuttgart (DE); Thomas Kemp, Esslingen (DE); Stefan Uhlich, Renningen (DE); Fritz Hohl, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 50 days.

(21) Appl. No.: 15/447,468

(22) Filed: Mar. 2, 2017

(65) Prior Publication Data

US 2017/0270915 A1 Sep. 21, 2017

(30) Foreign Application Priority Data

Mar. 15, 2016 (EP) ..................................... 16160537

(51) Int. Cl.
*G06F 17/27* (2006.01)
*G06F 17/30* (2006.01)
*G10L 15/18* (2013.01)
*G10L 15/22* (2006.01)
*G10L 15/30* (2013.01)

(52) U.S. Cl.
CPC ........ *G10L 15/1815* (2013.01); *G06F 17/279* (2013.01); *G06F 17/30017* (2013.01); *G06F 17/30026* (2013.01); *G06F 17/30241* (2013.01); *G06F 17/30654* (2013.01); *G06F 17/30976* (2013.01); *G10L 15/22* (2013.01); *G10L 15/30* (2013.01)

(58) Field of Classification Search
CPC ............... G06F 17/30; G06F 17/30017; G06F 17/30023; G06F 17/30026; G06F 17/30241; G06F 17/30654; G10L 15/22; G10L 2015/221; G10L 2015/225
See application file for complete search history.

(56) References Cited

U.S. PATENT DOCUMENTS

| 5,692,176 | A | * | 11/1997 | Holt | ..................... G06F 17/274 |
| 5,754,736 | A | * | 5/1998 | Aust | ................... G10L 15/1822 704/252 |
| 5,924,090 | A | * | 7/1999 | Krellenstein | ..... G06F 17/30696 |
| 6,513,033 | B1 | * | 1/2003 | Trauring | ........... G06F 17/30737 |
| 7,225,131 | B1 | * | 5/2007 | Bangalore | ............... G06F 3/038 704/270 |
| 7,789,802 | B2 | | 9/2010 | Lee et al. | |
| 8,682,660 | B1 | * | 3/2014 | Lyudovyk | ........... G06F 17/2785 704/231 |
| 8,849,610 | B2 | | 9/2014 | Molettiere et al. | |

(Continued)

OTHER PUBLICATIONS

Peng-Wen Chang et al. "A Language-Based Approach to Indexing Heterogeneous Multimedia Lifelog", ICMI-MLMI 2010, CMU repository, 8 pages.

*Primary Examiner* — Eric Yen
(74) *Attorney, Agent, or Firm* — Xsensus LLP

(57) ABSTRACT

An electronic device comprising circuitry configured to record sensor data that is obtained from data sources and to retrieve information from the recorded sensor data using concepts that are defined by a user.

22 Claims, 10 Drawing Sheets

(56) References Cited

U.S. PATENT DOCUMENTS

| | | | |
|---|---|---|---|
| 8,887,306 B1* | 11/2014 | Palacio | H04N 21/23433 713/182 |
| 9,123,338 B1* | 9/2015 | Sanders | G10L 15/265 |
| 2002/0178002 A1* | 11/2002 | Boguraev | G06F 17/277 704/235 |
| 2002/0178005 A1* | 11/2002 | Dusan | G06F 17/271 704/254 |
| 2003/0105589 A1* | 6/2003 | Liu | G06F 17/30017 702/1 |
| 2003/0126235 A1* | 7/2003 | Chandrasekar | G06F 17/30864 709/220 |
| 2004/0044517 A1* | 3/2004 | Palmquist | G06F 17/2809 704/7 |
| 2004/0215449 A1* | 10/2004 | Roy | G10L 15/08 704/211 |
| 2004/0236574 A1* | 11/2004 | Ativanichayaphong | G06F 3/038 704/231 |
| 2006/0235881 A1* | 10/2006 | Masarie | G06F 17/278 |
| 2007/0043574 A1* | 2/2007 | Coffman | G06F 17/30899 704/275 |
| 2008/0104071 A1* | 5/2008 | Pragada | G06F 17/3043 |
| 2008/0201143 A1* | 8/2008 | Olligschlaeger | H04M 3/2281 704/235 |
| 2009/0198746 A1* | 8/2009 | Hintze | G06F 17/30 |
| 2009/0216435 A1* | 8/2009 | Zheng | G06F 17/3087 701/533 |
| 2009/0228264 A1* | 9/2009 | Williams | G10L 13/027 704/9 |
| 2009/0281789 A1* | 11/2009 | Waibel | G06F 17/2735 704/3 |
| 2009/0327263 A1* | 12/2009 | Maghoul | G06F 17/30654 |
| 2011/0307241 A1* | 12/2011 | Waibel | G10L 15/265 704/2 |
| 2012/0004575 A1* | 1/2012 | Thorn | G06F 3/011 600/587 |
| 2012/0179641 A1* | 7/2012 | Ishioka | G06F 17/30265 706/54 |
| 2012/0253790 A1* | 10/2012 | Heck | G06F 17/30867 704/9 |
| 2013/0066849 A1* | 3/2013 | Saeki | G06F 17/30908 707/714 |
| 2013/0326353 A1* | 12/2013 | Singhal | G06F 3/167 715/728 |
| 2013/0332162 A1* | 12/2013 | Keen | G10L 15/26 704/235 |
| 2014/0081633 A1* | 3/2014 | Badaskar | G06F 17/30023 704/235 |
| 2014/0122541 A1 | 5/2014 | Kang et al. | |
| 2014/0214860 A1* | 7/2014 | Sako | G06F 17/3053 707/748 |
| 2014/0365517 A1* | 12/2014 | Calo | G06F 17/30401 707/760 |
| 2015/0134337 A1* | 5/2015 | Seo | G06F 17/30401 704/254 |

\* cited by examiner

ELECTRONIC DEVICE, SYSTEM, METHOD AND COMPUTER PROGRAM

TECHNICAL FIELD

The present disclosure generally pertains to the field of electronic devices, systems, and to methods and computer programs for such electronic devices and systems, in particular to electronic devices, systems, methods and computer programs for the field of activity tracking.

TECHNICAL BACKGROUND

Lifeloggers (also known as activity trackers) are mobile or wearable electronic devices and/or apps which allow to capture and process data from the user's own daily activities. Utilizing the GPS and motion processors of digital devices enables lifelogging apps to easily record metadata related to daily activities. A lifelogger may for example be used as fitness tracker to monitor activity and may spur its user to exercise more, helping to get fitter and/or lose weight. A lifelogger may be worn on the wrist like a watch or clipped onto a user's clothes and may have a display which shows the recorded information.

Although there exist techniques for life logging, it is generally desirable to provide electronic devices, systems, methods and computer programs which are more versatile than the existing techniques.

SUMMARY

According to a first aspect the disclosure provides an electronic device comprising circuitry configured to record sensor data that is obtained from data sources and to retrieve information from the recorded sensor data using concepts that are defined by a user.

According to a further aspect the disclosure provides a system comprising circuitry which is configured to record sensor data that is obtained from data sources and to retrieve information from the recorded sensor data using concepts that are defined by a user.

According to a yet further aspect the disclosure provides a method comprising recording sensor data that is obtained from data sources, and retrieving information from the recorded sensor data using concepts that are defined by a user.

According to a yet further aspect the disclosure provides a computer program comprising instructions that when executed cause circuitry to perform recording sensor data that is obtained from data sources, and retrieving information from the recorded sensor data using concepts that are defined by a user.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
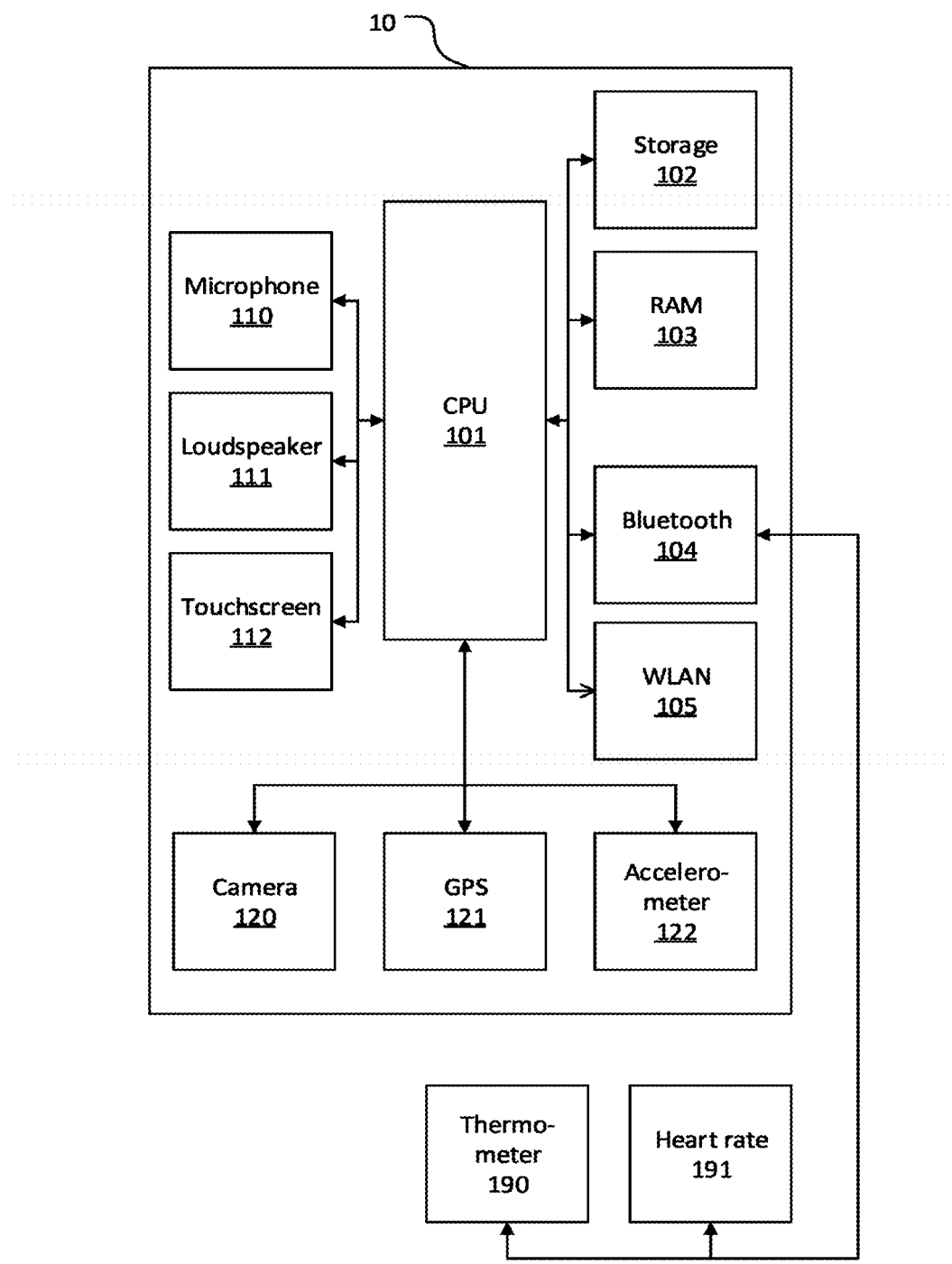
FIG. 1 schematically describes an embodiment of an electronic device that can act as activity tracker and that is connected with two companion devices.

Before a detailed description of the embodiments is given under reference of FIG. 1, general explanations are made.

As existing solutions for life logging are usually limited to the analysis of a predefined set of basic activities such as running, walking, cycling, sleeping, etc., there is a major issue when users are interested to retrieve information about past activities which are specific to them. For a more high level classification of activity such as "cycling to work", "having dinner with friends" or "weekly piano practice" the system should be personalized to the user.

An electronic device as described in the embodiments below comprises circuitry configured to record sensor data that is obtained from data sources and to retrieve information from the recorded sensor data using concepts that are defined by a user.

The electronic device may for example be a mobile or stationary electronic device, for example a mobile phone, a smartwatch, a wearable device, an activity tracker, an electronic glass, a tablet computer, a PC, or the like. The circuitry may for example be a processor such as a central processing unit (CPU) of a mobile phone, smartwatch, life logger, or PC.

Sensor data may be recorded from any data sources available on the electronic device, e.g. built into a mobile phone, and/or any data sources available on companion devices of the electronic device, for example devices associated with the electronic device, like e.g. devices that are external to a mobile phone and connected to the mobile phone by means of a wireless data connection. The sensor data may be raw sensor data obtained directly from a sensor device, or it may be pre-processed sensor data, for example filtered raw sensor data.

Sensors that are available on the electronic device may for example be location sensors such as a GPS sensor and/or an accelerometer, camera sensors for measuring ambient light, microphones for measuring ambient sound, or the like.

Also companion devices may be used as data sources such as biofeedback sensors, body analyzers, sleep and activity trackers. Such sensors may for example communicate via Bluetooth or Firewire with the electronic device and they may act as heart rate monitor, blood glucometers, thermometers, blood pressure monitor, and the like. The data recorded by a life logger may also be synchronized with a smartphone, tablet or PC for further analysis.

The electronic device may for example be configured to automatically look for available data sources and to automatically record sensor data available from such sensors. The electronic device may for example provide a sensor API for registering listeners to receive sensor data and for unregistering listeners to stop receiving sensor data. An electronic device may also provide an API method to obtain a list of all available data sources on the device and on companion devices.

Recording sensor data may comprise storing the sensor data in a data memory that is internal to the electronic device, such as a RAM, or a data storage such as a hard disk or a solid state drive. Alternatively, recording sensor data may also comprise storing the sensor data on an external device such as a memory card, an external disk drive, a server storage, a cloud storage, or the like.

In the embodiments described below, a concept that is defined by a user provides a generic description that relates a group of activities to each other. For example, a concept may relate those activities to each other which have specific characteristics in common. Activities that may be attributed to a specific concept might for example be related to each other by specific features/characteristics of a velocity profile, e.g. a common range of velocities occurring during the activities that belong to the concept, and/or a concept might be defined by specific features/characteristics of an acceleration profile, and/or a concept might be defined by specific features/characteristics of a heart rate profile. Such common features/characteristics, by relating a plurality of alike/homogeneous activities to each other, can define a concept that describes the activities that are related to each other.

An example concept may for example describe the activity of cycling. Another example concept may describe the activity of running. Still other example concepts may describe activities such as walking, playing football, playing tennis, sleeping, working, watching TV, eating, practicing a music instrument, or the like.

An activity that matches the concept "cycling" may also be denoted as an instance of this concept. Assume for example that a user cycled on Monday, 1st March From 9:02 to 9:55 From location A to location B, then this activity belongs to the concept of "cycling".

A definition of concepts may allow the electronic device to attribute recorded sensor data to a defined concept, i.e. to identify certain activities in the sensor data that match a defined concept. For example, a concept of cycling may enable the electronic device to attribute sensor data that is characteristic for a cycling activity to the concept of cycling.

Retrieving information from the recorded sensor data using concepts that are defined by a user may comprise finding activities that match a defined concept. This may enable the electronic device to identify certain activities in recorded sensor data after the sensor data has been collected. For example a query from the user could be: "How many times have I cycled to work this month". In order to resolve this query, the concept "cycling to work" is defined by the user, for example by one of the question and answer processes described in the embodiment below in more detail. The electronic device may then react on this query by returning information about all activities found in the sensor data that match the concept "cycling to work".

Retrieving information from the recorded sensor data using concepts that are defined by a user may be performed on a central processing unit located in the electronic device. The circuitry of the electronic device may also cooperate with a server or a cloud processing system in order to perform the retrieving information from the recorded sensor data. For example, the circuitry of the electronic device may be configured to send sensor data and user queries to a server or cloud processing system where the sensor data is analyzed in accordance with the user queries and the results of this analysis are returned to the electronic device for displaying them to the user of the electronic device.

A concept must not necessarily be known to the electronic device during recording of the sensor data. A concept can be defined by a user later, after recording of the data, when a user wants to retrieve information from the recorded sensor data that matches this concept. In the embodiments described below, an electronic device thus enables a user to define concepts after the sensor data has been collected. Still further, the circuitry of the electronic device may be configured to record sensor data without any intervention from the user.

For example, in embodiments described below, the electronic device automatically records all sensor data available from data sources and a user must not manually label the recorded sensor data as belonging to a specific activity before, during or after recording the data.

According to embodiments described below in more detail, a concept is defined based on a dialogue between the electronic device and the user. A dialogue between the electronic device and the user may be any process where the electronic device prompts the user to provide information which allows to define a concept.

A dialogue between the electronic device and the user may for example be realized by implementing speech recognition and speech output in the electronic device. Speech recognition may be used to detect spoken queries of a user. Speech output may be used to present results of user queries to the user. Alternatively, man-machine interfaces such as displays, keyboards, buttons and touch screens may be used to realize a dialogue between the user and the electronic device.

The circuitry of the electronic device may be configured to perform natural language processing to analyze user queries. Natural language processing (NLP) is a field of computer science, artificial intelligence, and computational linguistics concerned with the interactions between computers and human (natural) languages. Natural language processing allows natural language understanding, that is, enabling computers to derive meaning from natural language input, and others involve natural language generation. Any natural language processing methods known to the skilled person may be used for analyzing user queries, i.e. for deriving meaning from natural language input.

The circuitry of the electronic device may also be configured to pass detected speech to a server-based or to a cloud-based natural language processing system to derive meaning from natural language input.

A dialogue between the electronic device and the user may comprise one or multiple steps. For example, the electronic device may recognize that there is not yet enough information available to define a specific concept and thus decide that the dialogue should continue to retrieve more information about a concept from the user.

The circuitry of the electronic device may be configured to define a concept for an activity through a question and answer process between the user and the electronic device. For example the query from the user can be: "How many times have I cycled to work this month". "How many times have I" and "this month" might be predefined elements already known and identifiable by standard natural language processing methods. However "cycled to work" might not. In this case, the electronic device can request a definition of "cycled to work" by, for example, engaging in a dialogue with the user to define "cycled to work". Later, when the concept "cycled to work" is defined the user can make other related queries such as: "How many times have I cycled to work this year" without having to define "cycled to work" again.

The circuitry of the electronic device may for example be configured to specify a new concept by reference to sensor data related to a previous instance of this concept. For example, if a user asks the electronic device about a specific activity and a concept for this activity is not yet defined, the electronic device may ask a user to specify a time period during which the user performed this specific activity. The electronic device may then use the sensor data recorded during that time period to define a concept that describes this activity. For example, if a user asks the electronic device "How many times have I cycled to work this month?", the electronic device may ask the user "When did you cycle to work last?". The user may than point to a specific instance in time when he performed the activity "cycling to work", e.g. by stating "Last Monday morning". The electronic device may than decide that this information is not sufficient to define a concept for "cycling to work" and decide to further query the user about more precise information, e.g. by asking the user: "When did you start cycling to work on Monday morning?". The user may answer this question by stating "At 7:30". The electronic device may further ask the user: "When did you end cycling to work on Monday morning?". The user may answer this question by stating "At 7:48". Having retrieved this information from the user, the electronic device may analyse the sensor data collected during the time period between 7:30 and 7:48 in order to define a concept for the activity "cycling to work".

The circuitry of the electronic device may also be configured to specify a new concept by relating to or modifying an existing concept. For example, if a user asks the electronic device about a specific activity and a concept for this activity is not yet defined, the electronic device may ask the user to identify a relation to an existing concept that is to some extent similar to the new activity. For example, if "driving to work" is a concept that is already defined, a user may specify the concept "cycling to work" by stating to the electronic davie that "cycling to work is similar to driving to work but slower". The electronic device may than take over the definition of the concept "driving to work" and apply amendments to that definition which reflect that cycling is slower than driving.

The circuitry of the electronic device may be configured to specify a new concept by using linguistic information. For example, if a user asks the electronic device about a specific activity and a concept for this activity is not yet defined, the electronic device may ask the user to verbally describe characteristics of this activity. For example, if a user asks the electronic device "How many times have I cycled to work this month?", the electronic device may ask the user "What are characteristics of cycling to work?". The user may than answer "Cycling to work typically means moving at a speed of about 0 to 25 km/h". The destination of cycling to work is my place of work". The electronic device may than decide that this information is not sufficient to define a concept for "cycling to work" and decide to further query the user about more precise information, e.g. by asking the user: "Where is your place of work?". The user may answer this question by stating "My place of work is in the White House, Washington D.C.". Having retrieved this information from the user, the electronic device may analyse the recorded sensor data for time periods in with the recorded sensor data matches the characteristics defined for "cycling to work".

The circuitry of the electronic device may be configured to specify a new concept by visualization of results and confirmation by user. For example, the electronic device may show some parameters (locations, times, etc.) of hypothesis patterns of a concept and a user can select which ones are true.

Still further, the circuitry of the electronic device may be configured to specify a new concept by reference to an existing concept which is generic across users. For example, if a user asks the electronic device about a specific activity and a concept for this activity is not yet defined, the electronic device may ask the user to define this concept. The user may define the concept by referring to other users, e.g. by stating "Cycling to work is a very common activity made by many people". The electronic device may than consult a generic concept database to find if other users have already defined a concept with the name "cycling to work". If the electronic device finds a corresponding entry in the generic concept database, then it can use this generic concept to define the personal concept "cycling to work" for the user of the electronic device based on this generic concept for "cycling to work". If necessary, the electronic device may apply some modifications when taking over a generic concept, for example the electronic device may recognize that the user of the electronic device is cycling to some extent faster than defined in the generic concept and adapt the concept accordingly. As an alternative to consulting a generic concept database, the electronic device may also consult personal concepts defined by other users. Still alternatively, if the electronic device cannot identify a concept for "cycling to work", but if the electronic device can identify a concept for "cycling" which partly matches the concept "cycling to work", then the electronic device may use characteristics of this concept "cycling" as a basis for the personal profile "cycling to work".

Still further, the circuitry of the electronic device may be configured to use methods of linguistic semantics in order to find the relation of a new concept to a set of existing concepts.

In some embodiments described below, for example, concepts are defined based on concept elements. An electronic device may be configured to map concept elements to linguistic elements such as words, sentences, and/or pages. The electronic device may determine a linguistic distance of the new concept to one of the existing concept. There are several methods to measuring semantic distances between words or phrases, most of them map a word (or phrase) to a vector of real numbers. This is usually referred to as "word (or phrase) embedding". The semantic distance between pairs of words (or phrases) can be measured in the embedding space by measuring the distance between the corresponding vectors (using cosine distance for example). Popular word (or phrase) embeddings include the use of topics modeling approaches such as disclosed by Blei, David M., Andrew Y. Ng, and Michael I. Jordan. in "Latent dirichlet allocation.", the Journal of machine Learning research 3 (2003): 993-1022, and such as disclosed by Mikolov, Tomas, et al. in "Distributed representations of words and phrases and their compositionality.", Advances in neural in Formation processing systems, 2013.

The circuitry of the electronic device may be configured to use semantic analysis to distinguish existing concepts combined together in a query. For example a concept for the activity "cycling to work" may be seen as consisting of the combination of at least two sub-concepts, namely a sub-concept "cycling" and a sub-concept "arriving at work". In this example the concept is a sequence of concepts. Other concepts might me described by parallel concepts that cumulatively describe an activity, e.g. "moving at a speed between 10 and 20 km/h" and "heart beat rate between 100 and 130 bpm".

To break-up a combined concept (e.g. "cycling to work") into sub-concepts ("cycling" and "arriving at work"), a combination hypothesis builder may be used to build up a set of possible combinations of concepts (possibly including concepts already known by the electronic device) that might make up the combination concept in the query. Still further, to break-up a combined concept (e.g. "cycling to work") into sub-concepts ("cycling" and "arriving at work") texts may be generated from the sub-concepts in the combinations hypothesis. Still further, to break-up a combined concept (e.g. "cycling to work") into sub-concepts ("cycling" and "arriving at work") Recognizing Textual Entailment (RTE) technics such as disclosed by Watanabe, Yotaro, et al. in "Overview of the Recognizing Inference in Text (RITE-2) at NTCIR-10.", Proceedings of the 10th NTCIR Conference, 2013 may be used to evaluate the combination hypothesis: If the generated text entails a sentence that contains the combined concept, and if this combination is minimal (i.e. no sentence in the text can be removed) then the combined concept consists of the concepts in the text.

This mechanism of breaking-up a combined concept into sub-concepts may even allow to check for different relations between the concepts. For example, "He cycled this morning. Then, he arrived at work." entails "he cycled to work" and "He arrived at work. Then, he cycled all morning." entails "he cycled at work".

With the proposed electronic device, users may be able to retrieve high level information as opposed to be limited to basic activities. Furthermore the high level activities are personalized to the user and defined by features specific to him/her and not characterized by predefined standard features which may not apply to a particular person and lifestyle.

Also, according to embodiments, a user can query any activity of interest as long as it can be characterized from the captured sensor data.

In the embodiments it is also provided a system that comprises circuitry which is configured to record sensor data that is obtained from data sources and to retrieve information from the recorded sensor data using concepts that are defined by a user. The system may comprise an electronic device such a smartphone or activity tracker. Still further, the system may comprise a server and/or a cloud computing platform. The circuitry may be located in the electronic device, or it may be a distributed processing system where part of the processing is done on the electronic device, in a server computer, and/or in a cloud processing platform.

In the embodiments it is also provided a method comprising recording sensor data that is obtained from data sources and, retrieving information from the recorded sensor data using concepts that are defined by a user. The method may comprise any of the procedural steps that are described above with regard to the processing done by an electronic device, respectively by circuitry of an electronic device.

In the embodiments it is also provided a computer program comprising instructions that when executed cause a processor to perform recording sensor data that is obtained from data sources and, retrieving information from the recorded sensor data using concepts that are defined by a user. The computer program may implement any of the procedural steps that are described above with regard to the processing done by an electronic device, respectively by circuitry of an electronic device.

FIG. 1 schematically describes an embodiment of an electronic device that can act as activity tracker and that is connected with two companion devices.

The electronic device 10 comprises a CPU 101 as processor. The electronic device 10 further comprises a microphone 110, a loudspeaker 111, and a touchscreen 112 that are connected to the processor 10. These units 110, 111, 112 act as a man-machine interface and enable a dialogue between a user and the electronic device. The electronic device 10 further comprises a Bluetooth interface 104 and a WLAN interface 105. These units 104, 105 act as I/O interfaces for data communication with external devices such as companion devices, servers, or cloud platforms. The electronic device 10 further comprises a camera sensor 120, a GPS sensor 121 and an accelerometer sensor 122. These units 120, 121, 122 act as data sources and provide sensor data. The electronic device 10 is connected to two companion devices, namely a thermometer 190 and a heart rate sensor 191, via the Bluetooth interface 104. These units 190, 191 also act as data sources and provide sensor data to electronic device 10. The electronic device 10 further comprises a data storage 102 and a data memory 103 (here a RAM). The data memory 103 is arranged to temporarily store or cache data or computer instructions for processing by processor 101. The data storage 102 is arranged as a long term storage, e.g. for recording sensor data obtained from the data sources 120, 121, 122, 190, 191. It should be noted that the description above is only an example configuration. Alternative configurations may be implemented with additional or other sensors, storage devices, interfaces or the like. It should also be noted that microphone 110 which is listed above as unit attributed to the man machine-interface can likewise act as a source for sensor data. For example, microphone 110 may capture ambient sound that may allow processor 101 to recognize that the user of the electronic device is located on or near a traffic road, in an office building, in a forest, or the like.

Figure 2:
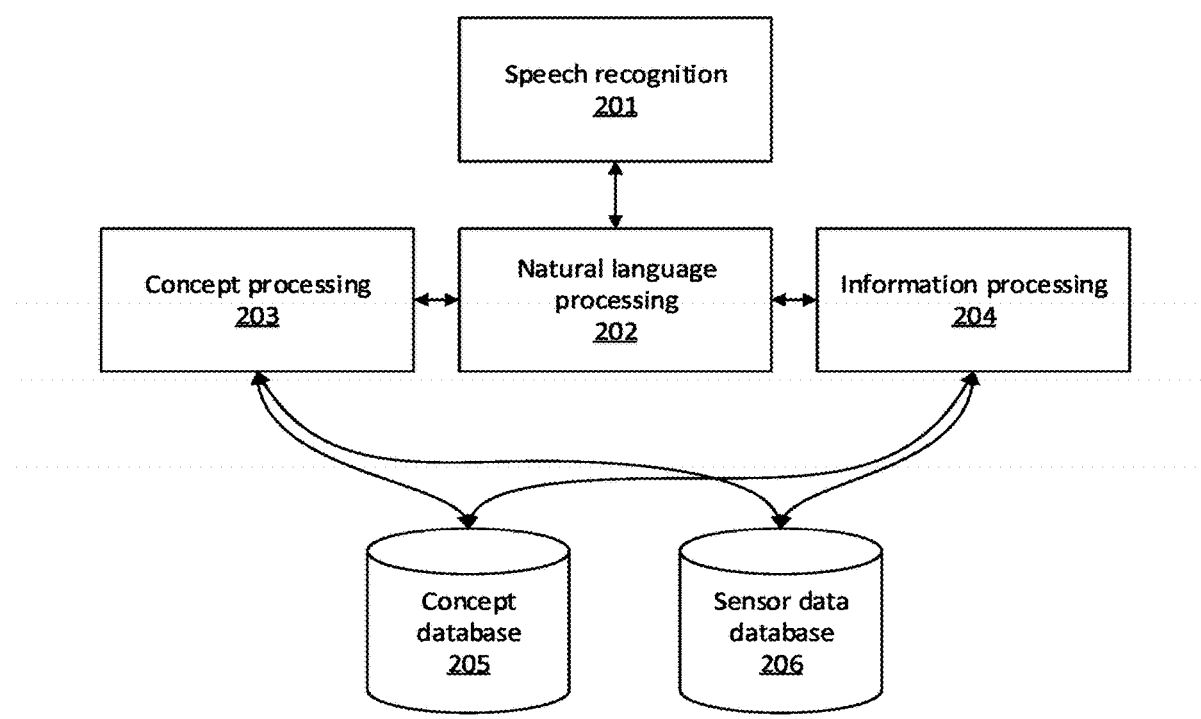
FIG. 2 schematically describes an embodiment of functional components of an electronic device that can act as activity tracker.

FIG. 2 schematically describes an embodiment of functional components of an electronic device that can act as activity tracker. A speech recognition component 201 is arranged to obtain a digitized sound signal representing speech captured by a microphone (e.g. microphone 110 of FIG. 1) and to convert the digitized sound signal into a text representation. The speech recognition component 201 cooperates with a natural language processing component 202 which is arranged to apply natural language processing methods such as a semantic analysis to a text representation of a speech signal. The natural language processing component 202 is applied in a dialogue which happens between a user and its electronic device. For example, the natural language processing component 202 identifies a reference to the concept "cycling to work" within a text representation that reflects a query of the user. The natural language processing component 202 cooperates with a concept processing component 203. Still further, the concept processing component 203 cooperates with a concept database 205 which is arranged to store data that represents concepts and with a sensor data database 206 that stores sensor data collected by the electronic device. The concept processing component 203 may for example recognize that the concept "cycling to work" is not yet defined in concept database 205. Accordingly, the concept processing component 203 may cooperate with the natural language processing component 202 in order to query the user for a definition of the concept "cycling to work". The natural language processing component 202 further cooperates with an information processing component 204. The information processing component 204 cooperates with a sensor data database 206 that stores sensor data collected by the electronic device and with concept database 205. For example, the information processing component 204 can retrieve information from the sensor data in sensor data database 206 that corresponds to instances of a defined concept such as "cycling to work". The information processing component 204 makes use of a user interface (e.g. touchscreen 112 and/or or loudspeaker 111 in FIG. 1) to present information retrieved from the sensor data 206 to a user of the electronic device.

All functional components described with regard to the embodiment of FIG. 2 may be implemented by software that is executed on a processor (e.g. processor 101 of FIG. 1) which cooperates with a data storage and/or data memory (e.g. data storage 102 and/or data memory 103 of FIG. 1).

Figure 3:
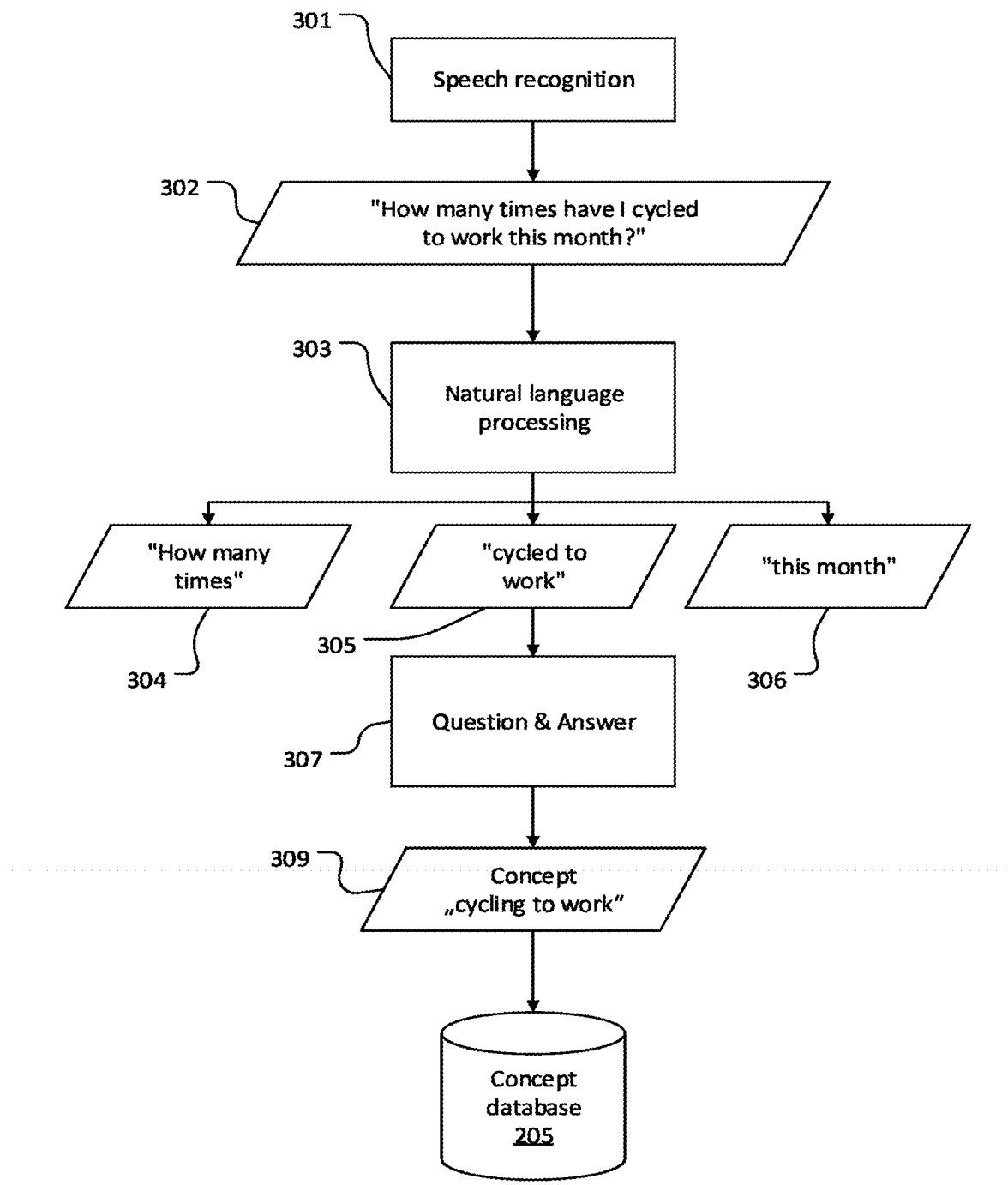
FIG. 3 schematically describes an embodiment of performing natural language processing on speech input of a user of an electronic device.

FIG. 3 schematically describes an embodiment of performing natural language processing on speech input of a user of an electronic device. Speech recognition 301 recognizes speech input of a user and transforms this speech input into a text representation, here the user query "How many times have I cycled to work this month?" 302. This user query 302 is passed to natural language processing 303 where natural language processing methods such as a semantic analysis are applied on the user query 302. The natural language processing 303 recognizes that the user query "How many times have I cycled to work this month?" 302 can be decomposed into a question part 304, namely "How many times", a concept part 305, namely "cycled to work", and an indication of a time period part 306, namely "this month". As it is assumed here that the concept part 305 relates to a concept "cycled to work" which is not yet defined, this concept is passed to a question and answer process 307 by which characteristics of the concept "cycling to work" are specified. The question and answer process 307 results in a respective representation of the concept 309, "cycled to work". This representation of the concept "cycled to work" 309 is stored a concept database 205.

Figure 4:
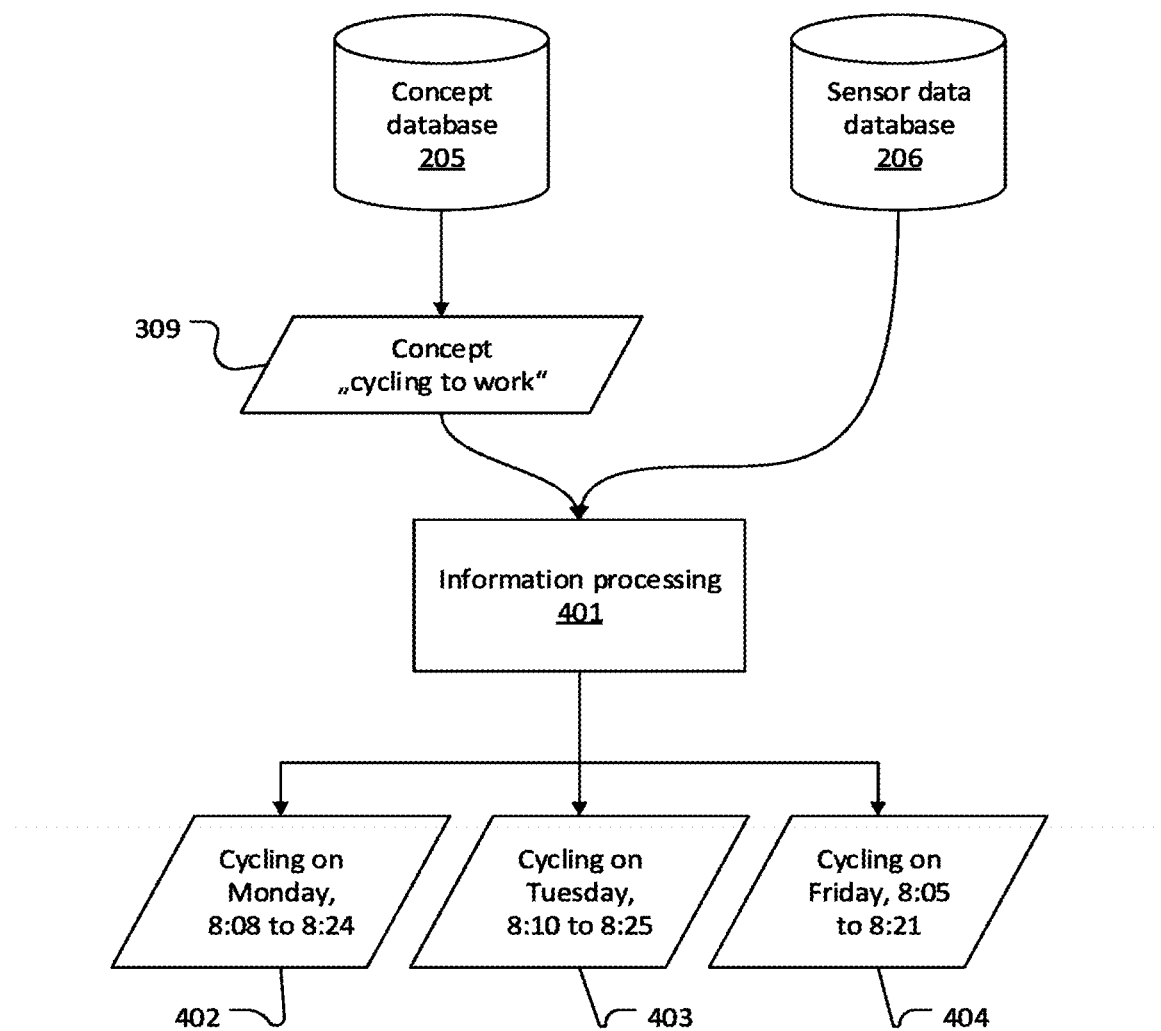
FIG. 4 schematically describes an embodiment of retrieving information from recorded sensor data using a concept that is defined by a user.

FIG. 4 schematically describes an embodiment of retrieving information from recorded sensor data using a concept that is defined by a user. A concept data base 205 stores representations of concepts. A sensor data base 206 stores sensor data recorded from different data sources. A representation of the concept "cycling to work" 309 is obtained from the concept database 205 and passed to information processing 401. Based on this concept "cycling to work" 309, the information processing 401 retrieves as information from the sensor data 206 three specific activities 402, 403, 404 which are identified as instances of the concept "cycling to work". A first activity 402 that is an instance of the concept cycling to work relates to cycling which a user performed on Monday, 8:08 to 8:24. A second activity 403 that is an instance of the concept cycling to work relates to cycling which a user performed on Tuesday, 8:10 to 8:25. A third activity 404 that is an instance of the concept cycling to work relates to cycling which a user performed on Friday, 8:05 to 8:21.

Figure 5:
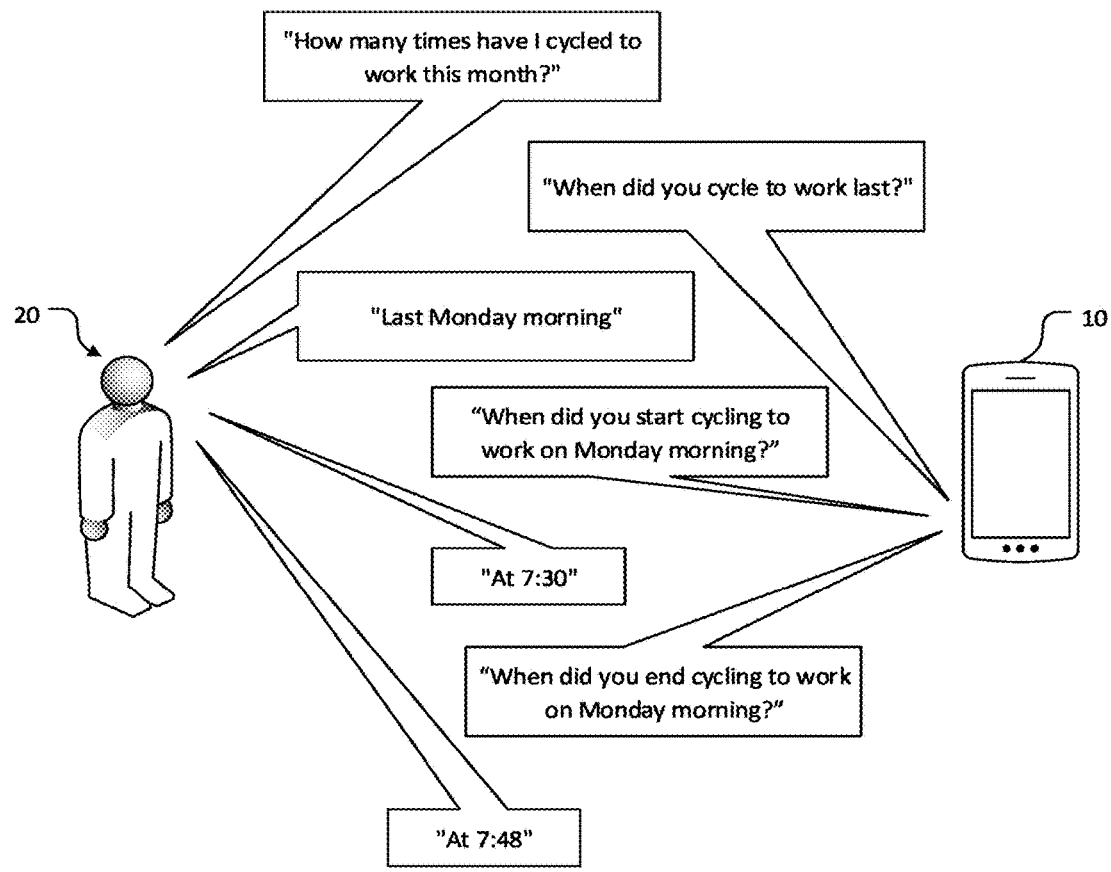
FIG. 5 schematically describes an exemplary question and answer process between a user and an electronic device for defining a concept by reference to sensor data related to a previous instance of this concept.

FIG. 5 schematically describes an exemplary question and answer process between a user and an electronic device for defining a concept by reference to sensor data related to a previous instance of this concept. A user 20 communicates with an electronic device 10 via speech recognition and speech output. The user 20 poses the user query "How many times have I cycled to work this month?" to the electronic device 10. The electronic device, using natural language processing as described with regard to FIG. 4 above, identifies the concept "cycling to work" in the user query and recognizes that this concept "cycling to work" is not yet defined (e.g. by confirming that there is no representation of the concept "cycling to work" stored in concept database 205 of FIG. 2). The electronic device 10 then decides to let the user 20 define the concept by reference to sensor data related to a previous instance of this concept. To this end, the electronic device 10 poses to user 20 the question: "When did you cycle to work last?". The user 20 answers to this question of the electronic device 10 by stating "Last Monday morning". The electronic device 10 analyses this answer of user 20 by natural language processing and recognizes that the answer given by user 20 is not yet a precise definition of a time period. Accordingly, the electronic device 10 poses to user 20 the question: "When did you start cycling to work on Monday morning?". The user 20 answers to this question of the electronic device 10 by stating "At 7:30". The electronic device 10 then poses to user 20 the question: "When did you end cycling to work on Monday morning?". The user 20 answers to this question of the electronic device 10 by stating "At 7:48". After this question and answer process, the electronic device 10 is able to identify a specific time period and consult sensor data recorded in this time interval to derive characteristics for a concept for cycling to work.

The following describes an example, how a definition of the concept for cycling to work retrieved by the above question and answer process and sensor data that confirms with this question and answer process might look like. For example, from a location sensor, a velocity sensor, and an acceleration sensor it is obtained that during the time period indicated by the user, the following characteristics are observed: The typical start location is the geocoordinate at which the user is located at the time instance identified by the user as the start of cycling to work (normally the geocoordinate/address of the user's home). The typical end location is the geocoordinate at which the user is located at the time instance identified by the user as the end of cycling to work (normally the geocoordinate/address of the user's place of work). From velocity sensor data accumulated during the time period identified by the user it is obtained a velocity profile that is characteristic for the concept cycling to work. Such a velocity profile may for example be characterized by the typical minimal, maximal and average velocity occurring in the time period (e.g. minimum velocity 0 km/h, maximal velocity 22 km/h, average velocity 16 km/h). From acceleration sensor data accumulated during the time period identified by the user it is obtained an acceleration profile that is characteristic for the concept cycling to work. Such an acceleration profile may for example be characterized by the typical maximal velocity occurring in the time period (e.g. 1 m/s$^2$ for the concept of cycling to work). Other parameters might be included, if available, for example a typical heart rate profile that occurs when the user cycles to work, the typical duration of cycling to work, and so on. A record of an activity may then be compared to a concept based on characteristics defining the concept.

An alternative way of defining a concept is to keep a record of all the features (positions, time, temperature, etc.) of past records already attributed to this concept. To check if a new record can be attributed to the concept, one can then look at how far the record's features are from the features of previous occurrences of this concept.

Other approaches to define concepts and to attribute activities to concepts may involve machine learning/modelling. For example a (probabilistic) model can be learnt from previous examples of attributed to this concept. Given the features of a new unlabelled record, the model can provide a probability or a score of this record to belong to a specific concept. Models that can be used include neural networks, support vector machines, Gaussian mixture models, etc. According to such approaches, if a probability/score is high enough, a record of an activity is attributed to the concept.

Figure 6:
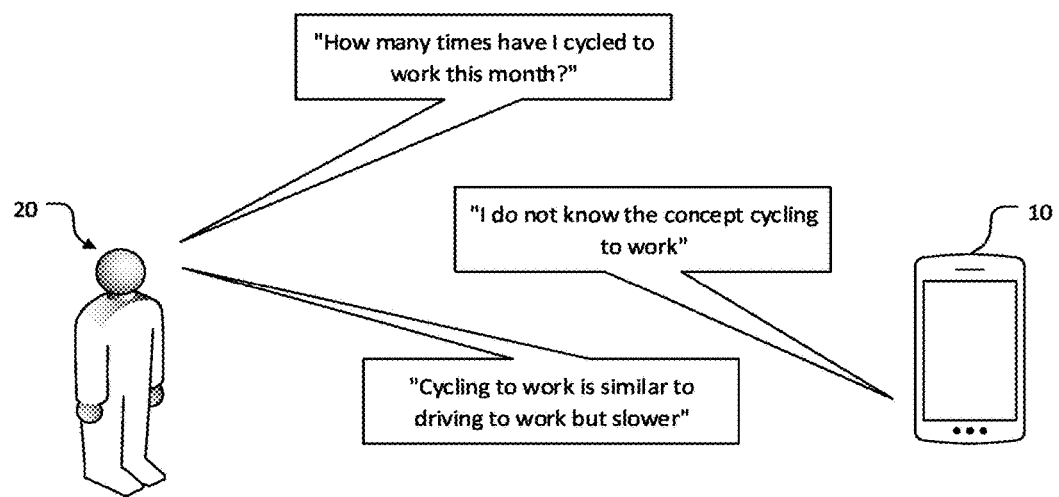
FIG. 6 schematically describes an exemplary question and answer process between a user and an electronic device for defining a concept by relating to or modifying an existing concept.

FIG. 6 schematically describes an exemplary question and answer process between a user and an electronic device for defining a concept by relating to or modifying an existing concept. A user 20 communicates with an electronic device 10 via speech recognition and speech output. The user 20 poses the user query "How many times have I cycled to work this month?" to the electronic device 10. The electronic device, using natural language processing as described with regard to FIG. 4 above, identifies the concept "cycling to work" in the user query and recognizes that this concept "cycling to work" is not yet defined (e.g. by confirming that there is no representation of the concept "cycling to work" stored in concept database 205 of FIG. 2). The electronic device 10 then decides to let the user 20 define the concept by relating to or modifying an existing concept. To this end, the electronic device 10 states to user 20: "I do not know the concept cycling to work". The user 20 reacts to this statement of the electronic device 10 by stating "Cycling to work is similar to driving to work but slower". The electronic device 10 can than take over the definition of the concept "driving to work" and apply amendments to that definition which reflect that cycling is slower than driving. After this question and answer process, the electronic device 10 is able to create a representation of the concept for cycling to work based on the representation of the concept for driving to work.

Figure 7:
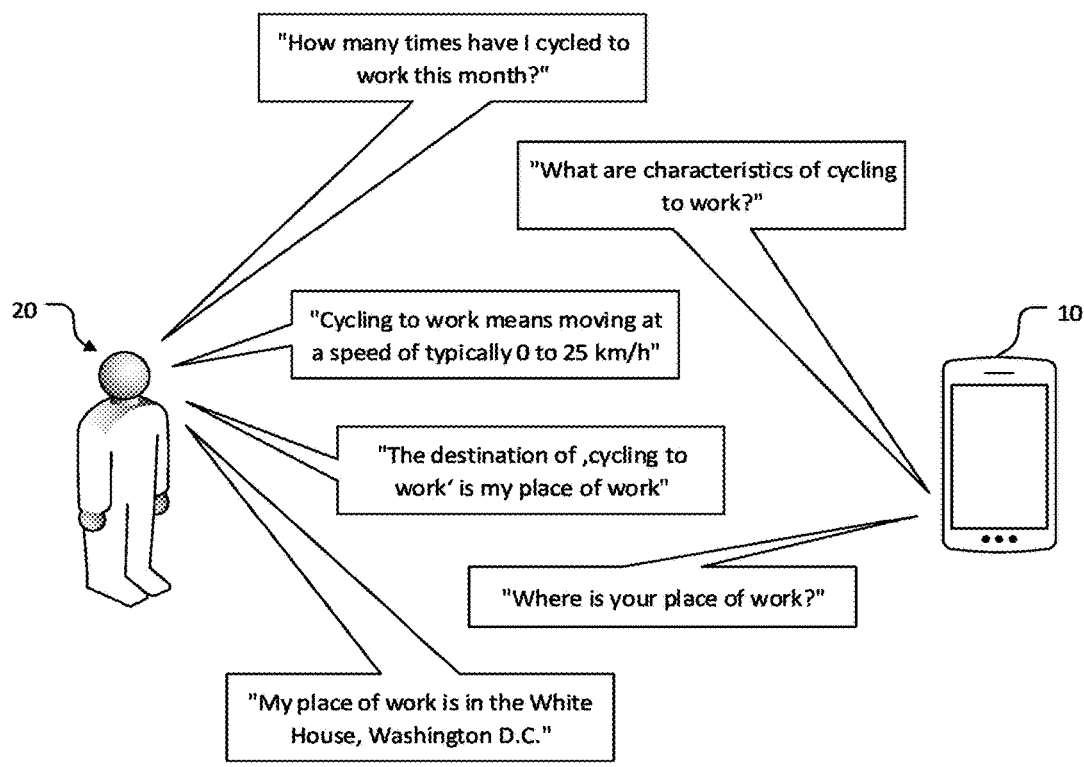
FIG. 7 schematically describes an exemplary question and answer process between a user and an electronic device for defining a concept by using linguistic information.

FIG. 7 schematically describes an exemplary question and answer process between a user and an electronic device for defining a concept by using linguistic information. A user 20 communicates with an electronic device 10 via speech recognition and speech output. The user 20 poses the user query "How many times have I cycled to work this month?" to the electronic device 10. The electronic device, using natural language processing as described with regard to FIG. 4 above, identifies the concept "cycling to work" in the user query and recognizes that this concept "cycling to work" is not yet defined (e.g. by confirming that there is no representation of the concept "cycling to work" stored in concept database 205 of FIG. 2). The electronic device 10 then decides to let the user 20 define the concept by using linguistic information. To this end, the electronic device 10 poses to user 20 the question: "What are characteristics of cycling to work?". The user 20 answers to this question of the electronic device 10 by stating "Cycling to work means moving at a speed of typically 0 to 25 kg/h". The user 20 further answers to the question of the electronic device 10 by stating "The destination of cycling to work is my place of work". The electronic device 10 analyses the answers of user 20 by natural language processing and recognizes that the answers given by user 20 do not yet give a precise definition of a geographic location. Accordingly, the electronic device 10 poses to user 20 the question: "Where is your place of work?". The user 20 answers to this question of the electronic device 10 by stating "My place of work is in the White House, Washington D.C.". After this question and answer process, the electronic device 10 has enough information to construct a representation of the concept for cycling to work.

Figure 8:
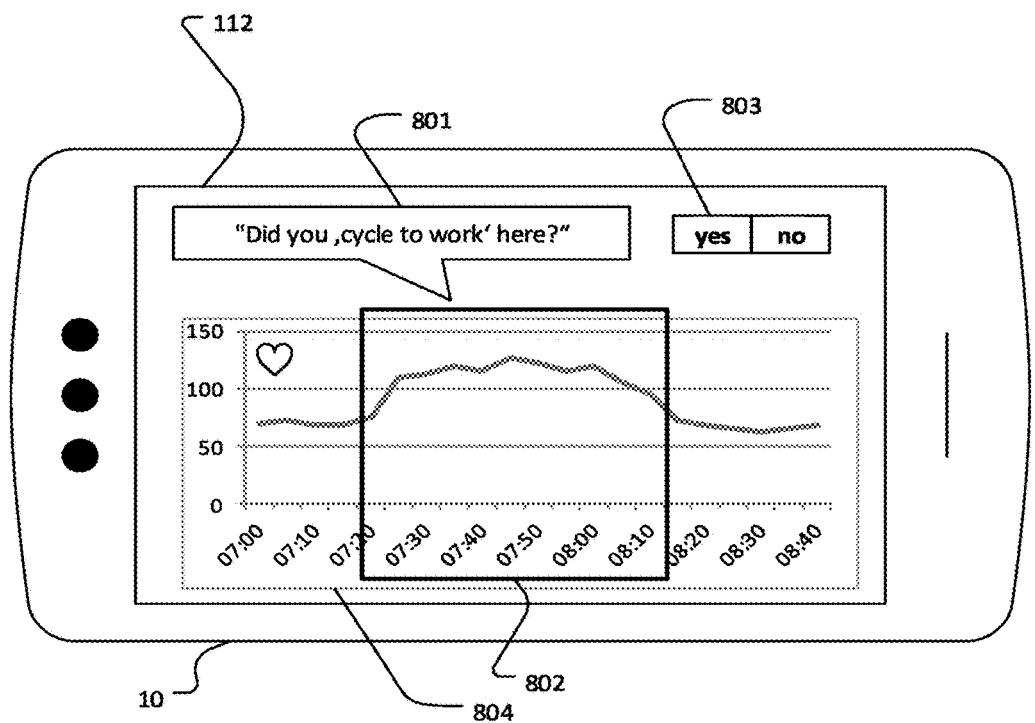
FIG. 8 schematically describes an exemplary question and answer process between a user and an electronic device for defining a concept by visualization of results and confirmation by user.

FIG. 8 schematically describes an exemplary question and answer process between a user and an electronic device for defining a concept by visualization of results and confirmation by user. A user communicates with an electronic device 10 via a touch screen 112. The electronic device 10 has identified the concept "cycling to work" in a user query and recognizes that this concept "cycling to work" is not yet defined (e.g. by confirming that there is no representation of the concept "cycling to work" stored in concept database 205 of FIG. 2). The electronic device 10 then decides to let the user define the concept by visualization of results and confirmation by user. To this end, the electronic device 10 identifies a candidate activity (e.g. by knowledge about related concepts such as 'cycling' and/or applying hypothesis testing) and presents to the user on the touch screen 112 a graph 804 of sensor data that displays the heart beat frequency over time for a time period that is located at and around the time when the candidate activity took place. The electronic device 10 marks the candidate activity with a box 802. Still further, the electronic device 10 presents to the user a touch element 803 by which the user can confirm or disconfirm that the candidate activity is indeed an instance of the concept "cycling to work". If the user confirms that the candidate activity is indeed an instance of the concept "cycling to work" the electronic device 10 is able to identify a specific time period and consult sensor data recorded in this time interval to derive characteristics for a concept for cycling to work. After this question and answer process, the electronic device 10 is able to identify a specific time period and consult sensor data recorded in this time interval to derive characteristics for a concept for cycling to work. This touch screen based question and answer process of FIG. 8 thus allows the electronic device 10 to define a concept for cycling to work by visualization of results and confirmation by user.

Figure 9A:
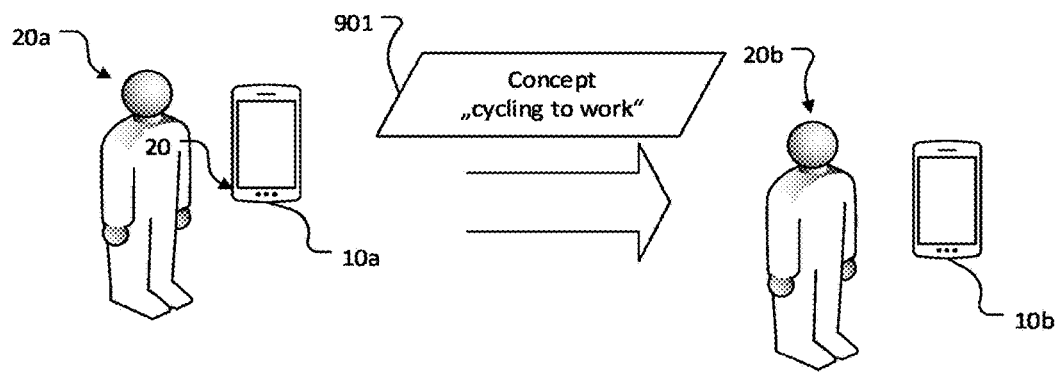
FIGS. 9a and 9b schematically describe exemplary processes between users and electronic devices for defining a concept by reference to an existing concept which is generic across users.
Figure 9B:
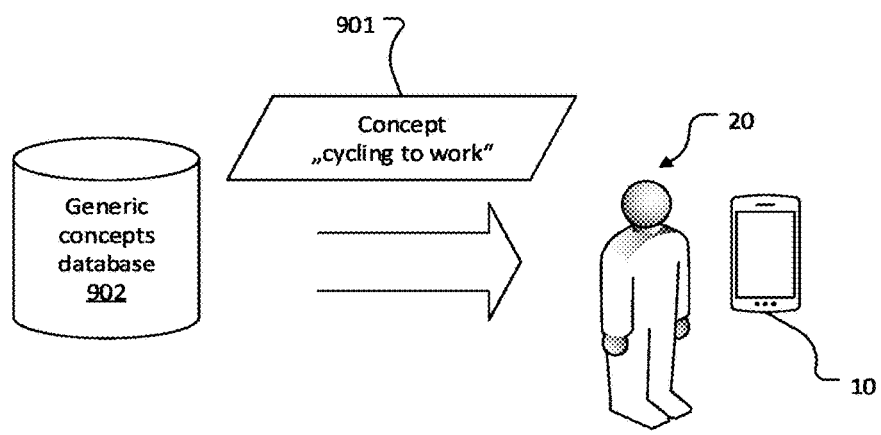

FIGS. 9a and 9b schematically describe exemplary processes between users and an electronic devices for defining a concept by reference to an existing concept which is generic across users.

According to the embodiment of FIG. 9a two users 20a and 20b communicate with two respective electronic devices 10a, 10b. The electronic device 10b has identified the concept "cycling to work" in a user query of user 20b and recognizes that this concept "cycling to work" is not yet defined in a personal concept database that is associated with electronic device 10b and user 20b. The electronic device 10b then decides to search in other user profiles for a concept "cycling to work". To this end, the electronic device 10b queries a personal concept database that is associated with electronic device 10a and user 20a. As a concept "cycling to work" is already defined in the personal concept database that is associated with electronic device 10a and user 20a, a copy 901 of the concept 'cycling to work' is transferred from the personal concept database that is associated with electronic device 10a and user 20a to the personal concept database that is associated with electronic device 10b and user 20b. This process allows the electronic device 10b to define a concept for cycling to work by reference to an existing concept which is generic across users.

According to the embodiment of FIG. 9b a user 20 communicates with an electronic devices 10. The electronic device 10 has identified the concept "cycling to work" in a user query of user 20 and recognizes that this concept "cycling to work" is not yet defined in a personal concept database that is associated with electronic device 10 and user 20. The electronic device 10 then decides to search in a generic concept database 902 for a concept "cycling to work". As a concept 'cycling to work' is already defined in the generic concept database 902 a copy 901 of the concept 'cycling to work' is transferred from the generic concept database 902 to the personal concept database that is associated with electronic device 10 and user 20. This process allows the electronic device 10 to define a concept for cycling to work by reference to an existing concept which is generic across users.

Figure 10:
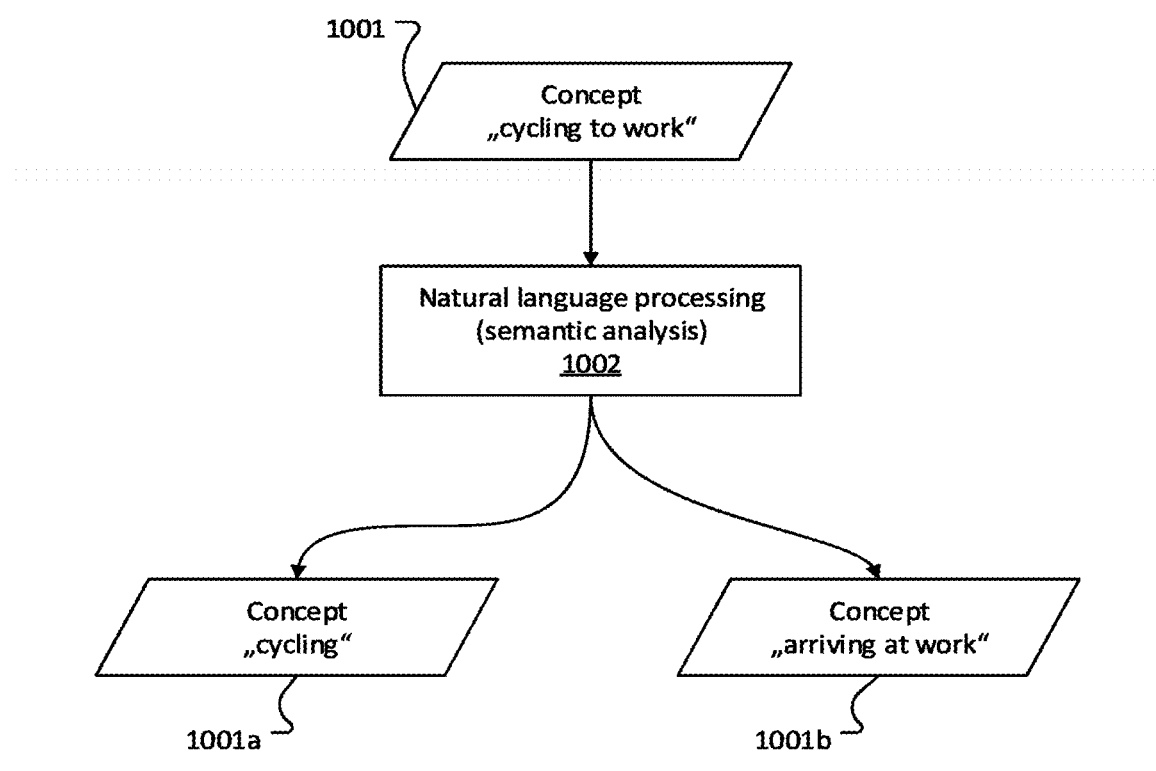
FIG. 10 schematically describes an embodiment of a process which uses semantic analysis to distinguishing existing concepts combined together in a query.

FIG. 10 schematically describes an embodiment of a process which uses semantic analysis to distinguishing existing concepts combined together in a query. According to the embodiment of FIG. 10 a user communicates with an electronic device. The electronic device has identified the concept "cycling to work" 1001 in a user query and recognizes that this concept "cycling to work" 1001 is not yet defined in a concept database that is associated with electronic device. The electronic device then decides to use semantic analysis to distinguishing existing concepts combined together in a query. To this end, the electronic device passes a text representation of the concept "cycling to work" 1001 to natural language processing. The natural language processing by methods such as semantic analysis decomposes the concept "cycling to work" 1001 into elements, namely the sub-concept "cycling" 1001a and the sub-concept "arriving at work" 1001b. As a concept "cycling" and a concept "arriving at work" is already defined in the concept database associated with the electronic device, the electronic device can derive characteristics of a concept "cycling to work" from characteristics of the concept 'cycling' 1001a and from characteristics of the concept "arriving at work". This process allows the electronic device to define a concept for cycling to work by using semantic analysis to distinguishing existing concepts combined together in a query. In this way, the electronic device may use methods of linguistic semantics in order to find the relation of a new concept to a set of existing concepts.

It should be recognized that the embodiments describe methods with an exemplary ordering of method steps. The specific ordering of method steps is however given for illustrative purposes only and should not be construed as binding. For example the ordering of the two queries "When did you start cycling to work on Monday morning" and "When did you end cycling to work on Monday morning" in the embodiment of FIG. 5 may be exchanged. Other changes of the ordering of method steps are apparent to the skilled person.

Further, it should be recognized that the division of the electronic device 10 of FIG. 1 into units 101 to 122 is only made for illustration purposes and that the present disclosure is not limited to any specific division of functions in specific units. For instance, processor 101, touch screen 112, and other components may be implemented by a respective programmed processor, field programmable gate array (FPGA), software and the like. The same applies for the functionalities that are presented in the embodiment of FIG. 2.

Further, it should be recognized that as far as the disclosure refers to circuitry that is configured to perform a specific function, it is foreseen that circuitry may be configured to perform the specific function by processing instructions such as software, computer programs, and the like.

Methods for controlling an electronic device, such as electronic device 10, are discussed above. These methods can also be implemented as a computer program causing a computer and/or a processor (such as processor 101 in FIG. 1 discussed above), to perform the methods, when being carried out on the processor.

In some embodiments also a non-transitory computer-readable recording medium is provided that stores therein a computer program product, which, when executed by a processor, such as the processor described above, causes the method described to be performed.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below.

(1) An electronic device comprising circuitry configured to record sensor data that is obtained from data sources and to retrieve information from the recorded sensor data using concepts that are defined by a user.

(2) The electronic device of (1), wherein the circuitry is configured to record sensor data without any intervention from the user.

(3) Electronic device according of (1) or (2), wherein a concept is defined based on a dialogue between the electronic device and the user of the electronic device.

(4) The electronic device of anyone of (1) to (3), wherein the circuitry is configured to define a concept through a question and answer process between the user and the electronic device.

(5) The electronic device of anyone of anyone of (1) to (4), wherein the circuitry is configured to specify a new concept by reference to sensor data related to a previous instance of this concept.

(6) The electronic device of anyone of (1) to (4), wherein the circuitry is configured to specify a new concept by relating to or modifying an existing concept.

(7) The electronic device of anyone of (1) to (4), wherein the circuitry is configured to specify a new concept by using linguistic information.

(8) The electronic device of anyone of (1) to (4), wherein the circuitry is configured to specify a new concept by visualization of results and confirmation by user.

(9) The electronic device of anyone of (1) to (4), wherein the circuitry is configured to specify a new concept by reference to an existing concept which is generic across users.

(10) The electronic device of anyone of (1) to (9), wherein the circuitry is configured to use methods of linguistic semantics in order to find the relation of a new concept to a set of existing concepts.

(11) The electronic device of anyone of (1) to (10), wherein the circuitry is configured to use semantic analysis to distinguishing existing concepts combined together in a query.

(12) A system comprising circuitry which is configured to record sensor data that is obtained from data sources and to retrieve information from the recorded sensor data using concepts that are defined by a user.

(13) A method comprising
recording sensor data that is obtained from data sources, and
retrieving information from the recorded sensor data using concepts that are defined by a user.

(14) A computer program comprising instructions that when executed cause circuitry to perform:
recording sensor data that is obtained from data sources, and
retrieving information from the recorded sensor data using concepts that are defined by a user.

(15) A non-transitory computer-readable recording medium that stores therein a computer program product, which, when executed by circuitry, causes the circuitry to perform:
recording sensor data that is obtained from data sources, and
retrieving information from the recorded sensor data using concepts that are defined by a user.

The present application claims priority to European Patent Application 16160537.3 Filed by the European Patent Office on 15 Mar. 2016, the entire contents of which being incorporated herein by reference.

The invention claimed is:
1. An electronic device comprising:
circuitry configured to
record sensor data that is obtained from data sources,
receive a description that identifies specific characteristics of the recorded sensor data and that relates a group of activities to each other,
define a concept based on the description,
update a concept database to include the defined concept,
find a subset of the recorded sensor data that has the specific characteristics in common, and
retrieve information from the subset of the recorded sensor data in response to a query from a user about the concept stored in the updated concept database.
2. The electronic device of claim 1, wherein the circuitry is configured to record sensor data without any intervention from the user.
3. The electronic device according to claim 1, wherein a concept is defined based on a dialogue between the electronic device and the user.
4. The electronic device of claim 1, wherein the circuitry is configured to define the concept through a question and answer process between the user and the electronic device.
5. The electronic device of claim 1, wherein the circuitry is configured to define the concept by reference to sensor data related to another concept.
6. The electronic device of claim 1, wherein the circuitry is configured to define the concept by relating to or modifying an existing concept.
7. The electronic device of claim 1, wherein the circuitry is configured to define the concept by using linguistic information.
8. The electronic device of claim 1, wherein the circuitry is configured to define the concept by visualization of results and confirmation by the user.
9. The electronic device of claim 1, wherein the circuitry is configured to define the concept by reference to an existing concept which is generic across a plurality of users.

10. The electronic device of claim 1, wherein the circuitry is configured to use methods of linguistic semantics in order to find a relation of the concept to a set of existing concepts.
11. The electronic device of claim 1, wherein the circuitry is configured to use semantic analysis to distinguish existing concepts combined together in a query.
12. The electronic device of claim 1, wherein the circuitry is further configured to receive the description from the user.
13. The electronic device of claim 1, wherein each of the activities in the group of activities are performed by the user.
14. The electronic device of claim 1, wherein the description defines a range of sensor data values as the specific characteristics.
15. The electronic device of claim 1, wherein the query from the user includes a question about the extent to which the concept applies to the recorded sensor data.
16. The electronic device of claim 1, wherein the circuitry is configured to record the sensor data at least during the performance of the activities.
17. A system comprising,
circuitry which is configured to
record sensor data that is obtained from data sources,
receive a description that identifies specific characteristics of the recorded sensor data and that relates a group of activities to each other,
define a concept based on the description,
update a concept database to include the defined concept,
find a subset of the recorded sensor data that has the specific characteristics in common, and
retrieve information from the subset of the recorded sensor data in response to a query from a user about the concept stored in the updated concept database.
18. The system of claim 17, wherein the circuitry is further configured to receive the description from the user.
19. A method comprising:
recording, by processing circuitry, sensor data that is obtained from data sources;
receiving a description that identifies specific characteristics of the recorded sensor data and that relates a group of activities to each other;
defining a concept based on the description;
updating a concept database to include the defined concept;
finding a subset of the recorded sensor data that has the specific characteristics in common; and
retrieving, by processing circuitry, information from the subset of the recorded sensor data in response to a query from a user about the concept stored in the updated concept database.
20. The method of claim 19, further comprising:
receiving the description from the user.
21. A non-transitory computer readable medium storing a computer program comprising instructions that when executed cause a processor to perform:
recording sensor data that is obtained from data sources;
receiving a description that identifies specific characteristics of the recorded sensor data and that relates a group of activities to each other;
defining a concept based on the description;
updating a concept database to include the defined concept;
finding a subset of the recorded sensor data that has the specific characteristics in common; and
retrieving information from a subset of the recorded sensor data in response to a query from a user about the concept stored in the updated concept database.

22. The non-transitory computer readable medium of claim 21 further storing an instruction that when executed causes the processor to perform receiving the description from the user.

* * * * *